(12) United States Patent
Wescott et al.

(10) Patent No.: US 7,717,713 B2
(45) Date of Patent: May 18, 2010

(54) WRITING GUIDE SYSTEM

(75) Inventors: Catherine H. Wescott, Beavercreek, OH (US); Michelle L. Martin, Maineville, OH (US); Thomas S. Walker, Kettering, OH (US); J. Michael Tims, Kettering, OH (US); Sandra L. Cashman, Heathrow, FL (US)

(73) Assignee: MeadWestvaco Corporation, Richmond, VA (US)

( * ) Notice: Subject to any disclaimer, the term of this patent is extended or adjusted under 35 U.S.C. 154(b) by 1011 days.

(21) Appl. No.: 11/281,135

(22) Filed: Nov. 17, 2005

(65) Prior Publication Data
US 2006/0214417 A1 Sep. 28, 2006

Related U.S. Application Data

(63) Continuation-in-part of application No. 10/360,084, filed on Feb. 7, 2003, now Pat. No. 7,118,135.

(51) Int. Cl.
*G09B 11/00* (2006.01)
(52) U.S. Cl. .................................................. 434/162
(58) Field of Classification Search ................ 434/162, 434/163, 164, 112, 115, 117; 283/117
See application file for complete search history.

(56) References Cited

U.S. PATENT DOCUMENTS

| | | | |
|---|---|---|---|
| 12,391 A | 2/1855 | MacLaurin | |
| RE6,271 E | 2/1875 | Forbriger | |
| D8,071 S | 2/1875 | Cone | |
| 433,725 A | 8/1890 | Ewing | |
| 636,432 A * | 11/1899 | Horney | 283/45 |
| 716,629 A * | 12/1902 | Dodge | 434/164 |
| 1,061,913 A | 5/1913 | Hughes | |
| RE14,488 E | 6/1918 | Davis | |
| 1,332,761 A | 3/1920 | Sargent | |
| 1,371,430 A * | 3/1921 | Nickerson | 434/117 |

(Continued)

FOREIGN PATENT DOCUMENTS

DE 3226758 3/1983

(Continued)

OTHER PUBLICATIONS

Sheet described in Attachment A; date unknown. Applicants admit the status of this publication as prior art for the limited purpose of examination of this application and reserve the right to challenge the status of this publication as prior art.

(Continued)

*Primary Examiner*—Kurt Fernstrom
(74) *Attorney, Agent, or Firm*—Alison R. Scheidler; Donald G. Bauer

(57) ABSTRACT

A writing guide system including a piece of sheet-like material having a depressed area in the shape of an alphanumeric character. In another embodiment the invention is a progressive writing guide system including a first set of papers including a writing guide feature, and a second set of papers including a writing guide feature. The second set of papers are coupled to the first set of papers. The writing guide feature of the first set of papers provides more guidance to a user that the writing guide feature of the second set of papers.

25 Claims, 10 Drawing Sheets

U.S. PATENT DOCUMENTS

| | | | |
|---|---|---|---|
| 1,414,102 A | 4/1922 | Sorby | |
| 1,426,055 A | 8/1922 | Fast | |
| 1,887,160 A | 11/1932 | Lorber | |
| 1,887,161 A | 11/1932 | Lorber | |
| 1,887,163 A | 11/1932 | Lorber | |
| 2,068,497 A | 1/1937 | Lorber | |
| 2,277,329 A * | 3/1942 | Kimbrough | 434/164 |
| 2,371,153 A | 3/1945 | Connelly | |
| 2,454,632 A | 11/1948 | Cohn | |
| 2,456,632 A | 12/1948 | Greebberg | |
| 2,616,198 A | 11/1952 | Sewell | |
| 2,850,811 A | 9/1958 | Boley | |
| 3,015,267 A | 1/1962 | Dashew | |
| 3,197,892 A | 8/1965 | Hancy | |
| 3,314,171 A | 4/1967 | Bethune | |
| 3,382,592 A | 5/1968 | Lucero | |
| 3,423,851 A | 1/1969 | Olalainty | |
| 3,486,246 A * | 12/1969 | Johnson, Jr. | 434/425 |
| 3,512,273 A | 5/1970 | Baker et al. | |
| 3,526,975 A | 9/1970 | Reeves | |
| 3,574,956 A | 4/1971 | Hamelin | |
| 3,667,139 A * | 6/1972 | Barr | 434/113 |
| 3,683,516 A | 8/1972 | Fass | |
| 3,733,468 A | 5/1973 | Eberly, Jr. | |
| 3,816,943 A * | 6/1974 | Henry | 434/117 |
| 3,869,813 A | 3/1975 | Hancy | |
| 3,959,894 A | 6/1976 | Hanson et al. | |
| 4,035,652 A | 7/1977 | Schroeder | |
| 4,130,946 A | 12/1978 | Coady | |
| 4,173,082 A | 11/1979 | Niquette | |
| 4,245,013 A | 1/1981 | Clegg et al. | |
| 4,268,256 A | 5/1981 | Moskowitz | |
| 4,425,095 A | 1/1984 | Morris | |
| 4,552,536 A | 11/1985 | Kay et al. | |
| 4,626,219 A * | 12/1986 | Goldreyer | 434/162 |
| 4,650,421 A | 3/1987 | Anczurowski | |
| 4,669,986 A * | 6/1987 | Yokoyama | 434/164 |
| 4,685,885 A | 8/1987 | Maddocks | |
| 4,735,516 A | 4/1988 | Galarneau | |
| 4,846,688 A | 7/1989 | Jones | |
| 4,859,094 A | 8/1989 | Okada | |
| 4,865,547 A | 9/1989 | Glover | |
| 4,988,126 A | 1/1991 | Heckenkamp et al. | |
| 5,217,378 A | 6/1993 | Donovan | |
| 5,232,535 A | 8/1993 | Brinley | |
| 5,516,291 A | 5/1996 | Miyake | |
| 5,722,693 A | 3/1998 | Wicker | |
| 6,142,783 A | 11/2000 | Rocha | |
| 6,302,696 B1 | 10/2001 | O'Neill | |
| 6,459,364 B2 | 10/2002 | Gupta | |
| 6,669,478 B2 | 12/2003 | Edwards et al. | |
| 7,118,135 B2 * | 10/2006 | Tims et al. | 283/117 |
| D534,951 S | 1/2007 | Woodward | |
| 2002/0127519 A1 | 9/2002 | Bhatt et al. | |
| 2004/0096807 A1 | 5/2004 | McGannon | |

FOREIGN PATENT DOCUMENTS

| | | |
|---|---|---|
| DE | 19549618 | 4/1997 |
| GB | 117420 | 7/1918 |

OTHER PUBLICATIONS

Sheet described in Attachment B; date unknown. Applicants admit the status of this publication as prior art for the limited purpose of examination of this application and reserve the right to challenge the status of this publication as prior art.

* cited by examiner

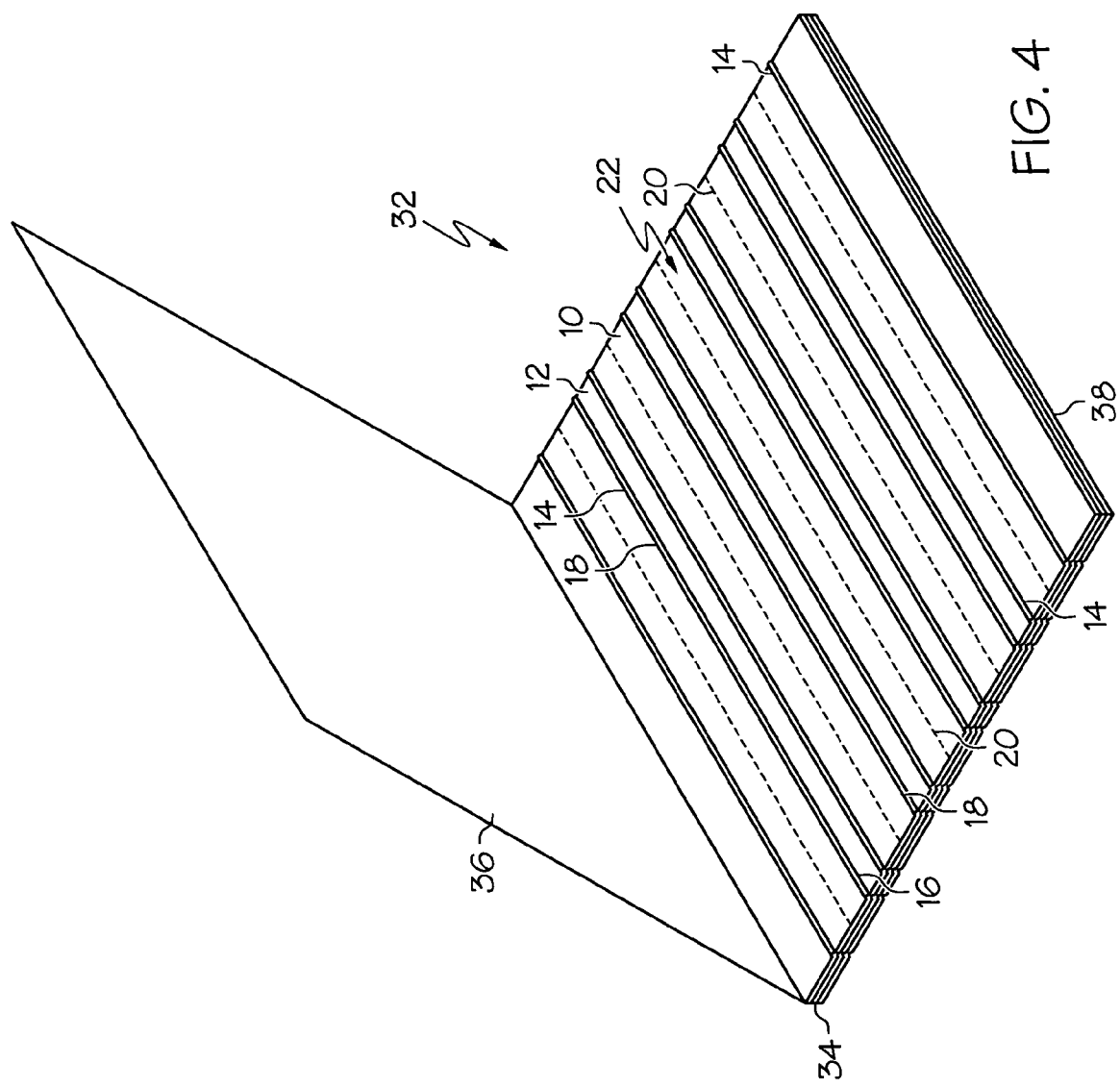

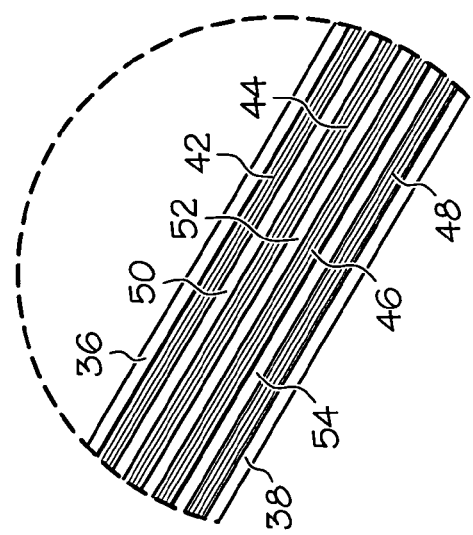
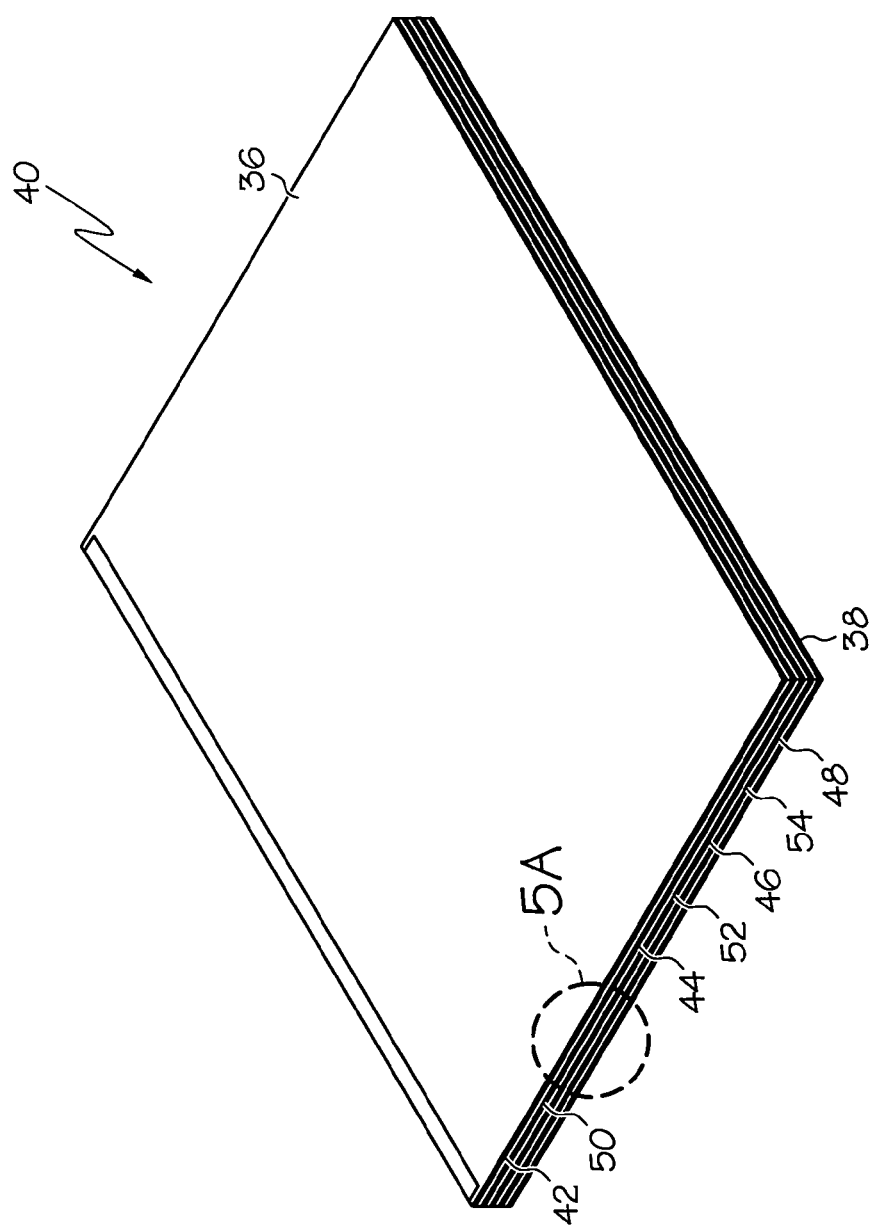

WRITING GUIDE SYSTEM

This application is a continuation-in-part of U.S. application Ser. No. 10/360,084, filed on Feb. 7, 2003 now U.S. Pat. No. 7,118,135, the entire contents of which are hereby incorporated by reference.

The present invention is directed to a writing guide system, and more particularly, to writing guide system for developing handwriting skills.

BACKGROUND

Writing paper is often used by school children and others to develop and refine their writing skills. The writing paper may include a plurality of lines located thereon to provide a guide to the user. However, such writing paper may not provide sufficient guidance to users in their early development of writing skills. In addition, such writing paper may not provide varying levels of guide features as a user develops his or her skills. Accordingly, there is a need for an improved writing guide system.

SUMMARY

In one embodiment, the present invention is a writing guide system which provides a relatively high level of guidance to users in the early development of writing skills. In another embodiment, the writing guide system of the present invention provides varying levels of guide features so that a user can advance to writing guides that provide progressively less guidance and more freedom.

In particular, in one embodiment the invention is a writing guide system including a piece of sheet-like material having a depressed area in the shape of an alphanumeric character. In another embodiment the invention is a progressive writing guide system including a first set of papers including a writing guide feature, and a second set of papers including a writing guide feature. The second set of papers are coupled to the first set of papers. The writing guide feature of the first set of papers provides more guidance to a user that the writing guide feature of the second set of papers.

BRIEF DESCRIPTION OF THE DRAWINGS

FIG. 4 is a front perspective view of a notebook of papers of FIG. 1;

FIG. 5 is a front perspective view of another notebook of papers, shown in its closed position;

FIG. 5A is a detail end view of the area 5A indicated in FIG. 5;

FIG. 8A is a detail view of the area 8A indicated in FIG. 8;

DETAILED DESCRIPTION

Figure 1:
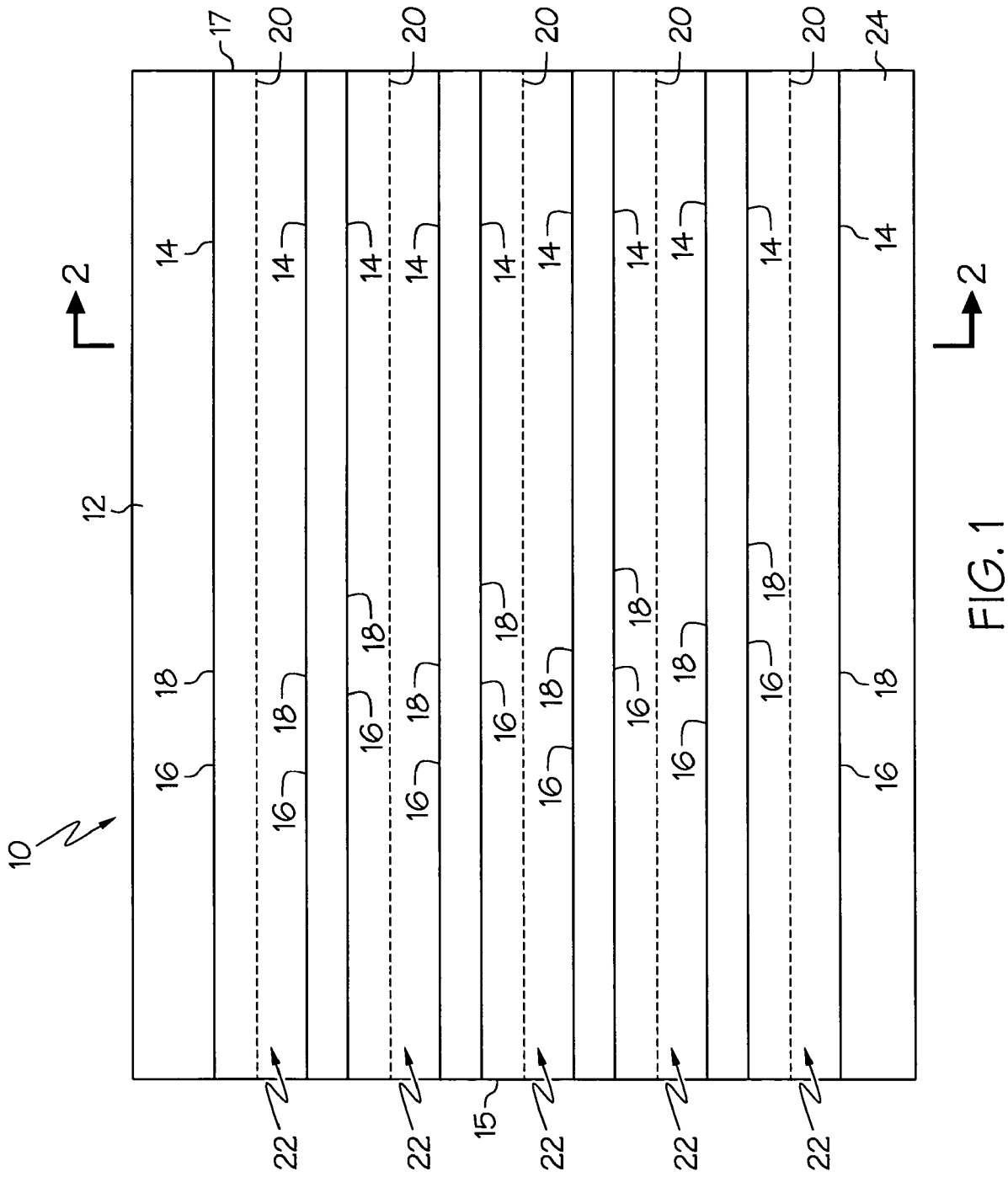
FIG. 1 is a top view of one embodiment of a paper which may be used in or as the writing guide of the present invention.

As shown in FIG. 1, a sheet 10, which may constitute or be used as part of the present invention, may include a sheet-like body portion 12. The body portion 12 can be made from nearly any material which can be written upon, including but not limited to, plastic or fiber-based paper made from a cellulose-based fiber pulp, synthetic materials, or a blend of pulp and synthetic materials. The body portion 12 may be made of a generally water-absorbent material such that the body portion 12 can be written upon by a wide variety of media, such as ink, pens, pencils, markers, highlighters and the like. The body portion 12 may have a thickness of less than about 0.5 mm.

Figure 2:
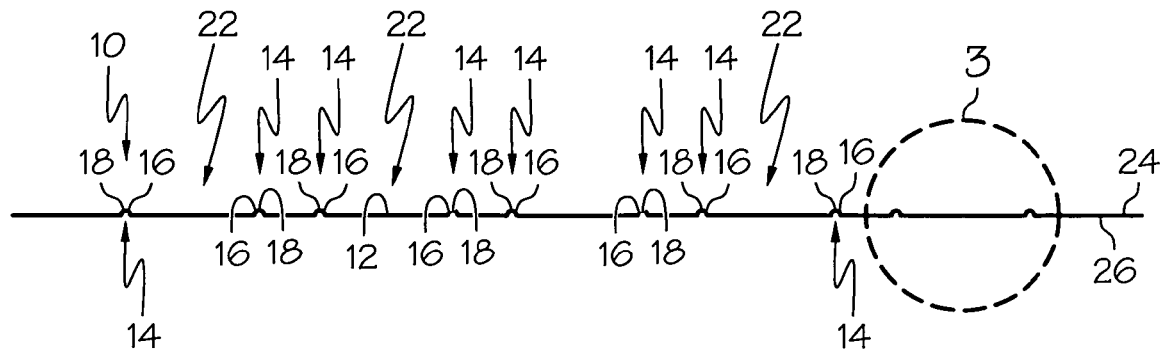
FIG. 2 is a side cross section taken along line 2-2 of FIG. 1.
Figure 3:
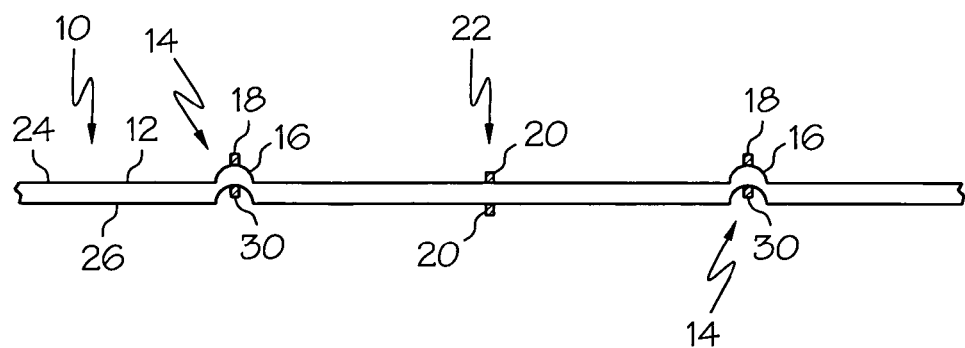
FIG. 3 is a detail view of area 3-3 of the sheet of FIG. 2.

The sheet 10 may include a writing guide feature in the form of plurality of generally straight, parallel guidelines 14 located thereon. As best shown in FIGS. 2 and 3, each guideline 14 may include an embossed line 16 and a printed line 18 located on the embossed line 16. In other words, each guideline 14 may be formed by an embossed line 16, with a printed line 18 located on top of the embossed line 16. Each guideline 14 may extend from one edge 15 of the sheet 10 to the opposite edge 17, or may extend the majority of the width or length of the sheet 10, for example, at least about 50% of the length or width of the sheet 10, or at least about 90% of the length or width of the sheet 10. Each guideline 14 can also extend the entire length or width of the sheet 10. The embossed lines 16 may be created by a wide variety of methods utilizing nearly any embossing technique that is well known in the art, such as by passing the sheet under an embossing roll or wheel, or between the nip of a pair of embossing rolls, etc.

Adjacent guidelines 14 may be spaced apart a sufficient distance to define a writing area 22 therebetween. For example, adjacent ones of the guidelines 14 may be spaced apart by a distance of between about ¼" and about 2" to define the writing area 22 therebetween. The sheet 10 may include a plurality of intermediate lines 20, with each intermediate line 20 being located between an adjacent pair of guidelines 14 and in one of the writing areas 22. In the illustrated embodiment, each of the intermediate lines 20 is a printed dotted line located on a generally flat portion of the body portion 12 (that is, each intermediate line 20 is not on an embossed portion of the sheet 10).

Each embossed line 16 may include a bead that is raised relative to the front side 24 of the body portion 12 and depressed relative to the rear side 26 of the body portion. As shown in FIG. 3, the sheet 10 may include a printed line 18 located on the front side 24 of the sheet 10 and on each embossed line 16 (each printed line 18 being schematically illustrated in FIG. 3 by a shaded rectangle although the actual printed line may lie flat on the embossed line 16).

Each embossed line 16 may also include a printed line 30 located on the rear side 26 and extending generally parallel thereto. Relative to the rear side 26 of the paper 10, each embossed line 16 may appear as a "debossed" line or a "line of depression." Thus, in this case each guideline 14 may include a debossed line with a printed line 30 located thereon. The rear side 26 of the sheet 10 may also include the intermediate guidelines 20 printed thereon. Accordingly, a top view of the rear side 26 of the sheet 10 may appear identical to the top view of the front side 24 of the sheet 10 shown in FIG. 1.

Each of the guidelines 14 may provide both a tactile and visual guide to the user, for example, when the user writes in the writing area 22. In particular, if the user's writing instrument engages or passes over a guideline 14, the resultant bump or area of depression can provide tactile feedback to the user. Furthermore, the user can also visually or tactilely note when the writing or writing instrument has extended beyond or is approaching the bounds of the writing area 22. Thus, the combination of the printed line 18, 30 and embossed or debossed line 16 of each guideline 14 can provide enhanced feedback so that a user can learn to stay in the writing area 22 to improve his or her writing skills.

As shown in FIG. 4, a plurality of sheets 10 may be bound together by a binding mechanism 34 to form a notebook 32 having a front cover 36 and a rear cover 38. The front 36 and rear 38 covers may be made from a relatively stiff material, such as cardboard, paperboard or plastic to protect the sheets 10 and provide stiffness and structure to the notebook 32. In the illustrated embodiment the binding mechanism 34 is an adhesive binding mechanism, but the binding mechanism 34 can take any of a variety of forms including but not limited to clips, clasps, binder rings, spiral wire or coil wire binding mechanism, staples, shrink-wrap or other packaging, etc.

FIG. 5 is a front prospective view of another notebook 40 including the front cover 36, rear cover 38, and a plurality of set of sheets. In particular, the notebook 40 may include a first 42, second 44, third 46 and fourth 48 sets of sheets. A first divider or piece of backing material 50 is located below the first set of sheets 42 (i.e. between the first 42 and second 44 set of sheets). A second divider or piece of backing material 52 is located below the second set of sheets 44 (i.e., between the second 44 and third 46 set of sheets). A third divider or piece of backing material 54 is located below the third set of sheets 46 (i.e. between the third 46 and fourth 48 set of sheets).

Figure 7:
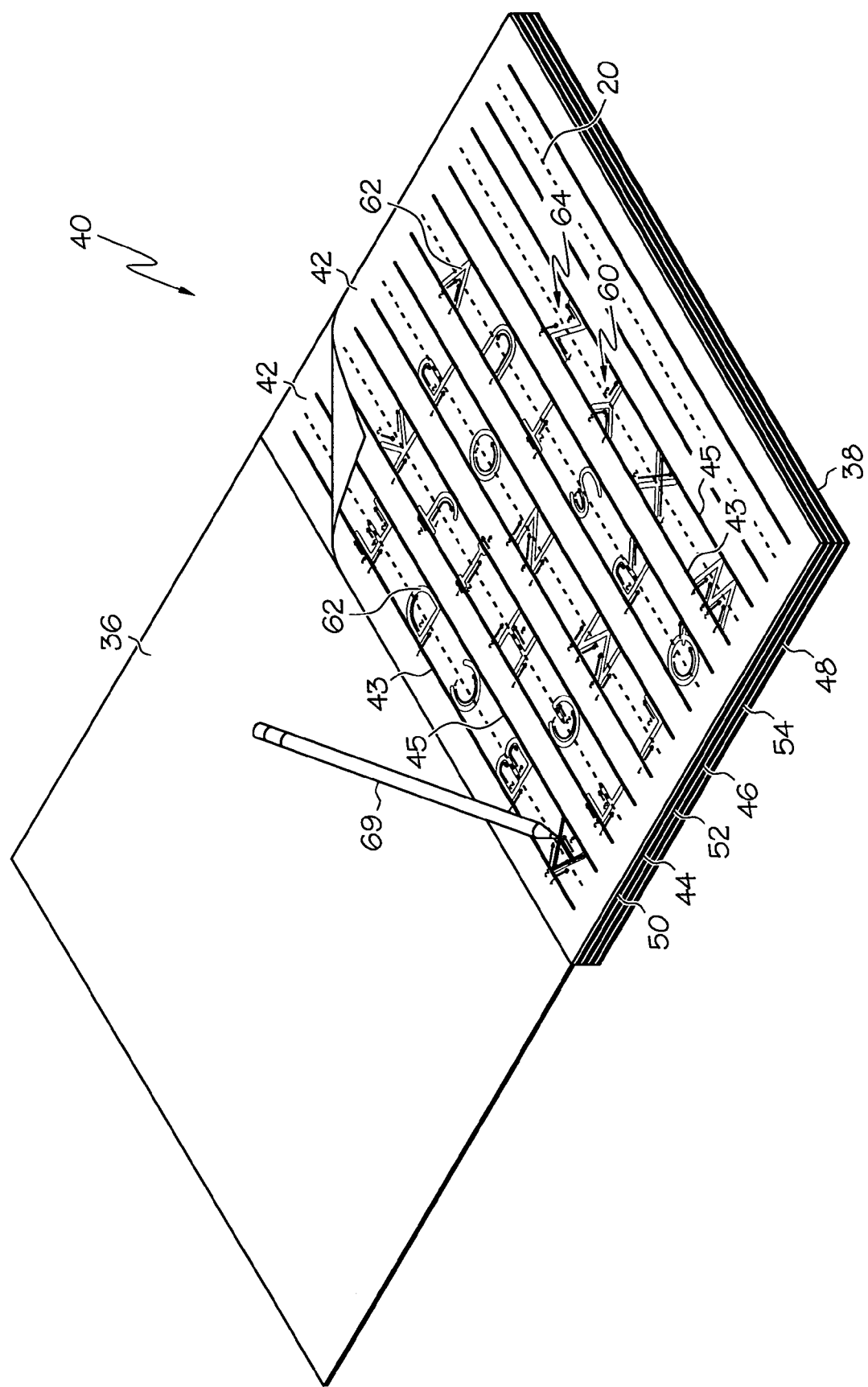
FIG. 7 is a front perspective view of the notebook of FIG. 6, showing a pencil marking on the first set of papers.

Each of the sheets in a set of sheets 42, 44, 46, 48 (and indeed all of the sheets of the notebook 40) may have generally the same size and shape, and may be generally aligned (i.e., such that their outer perimeters are aligned). Each of the sheets 42, 44, 46, 48 (and the dividers 50, 52, 54) maybe bound by an adhesive binding mechanism (or other binding mechanisms as outlined above), such that the sheets can be torn along the upper edge and removed, as desired, as shown in FIG. 7.

Figures 6, 6A:
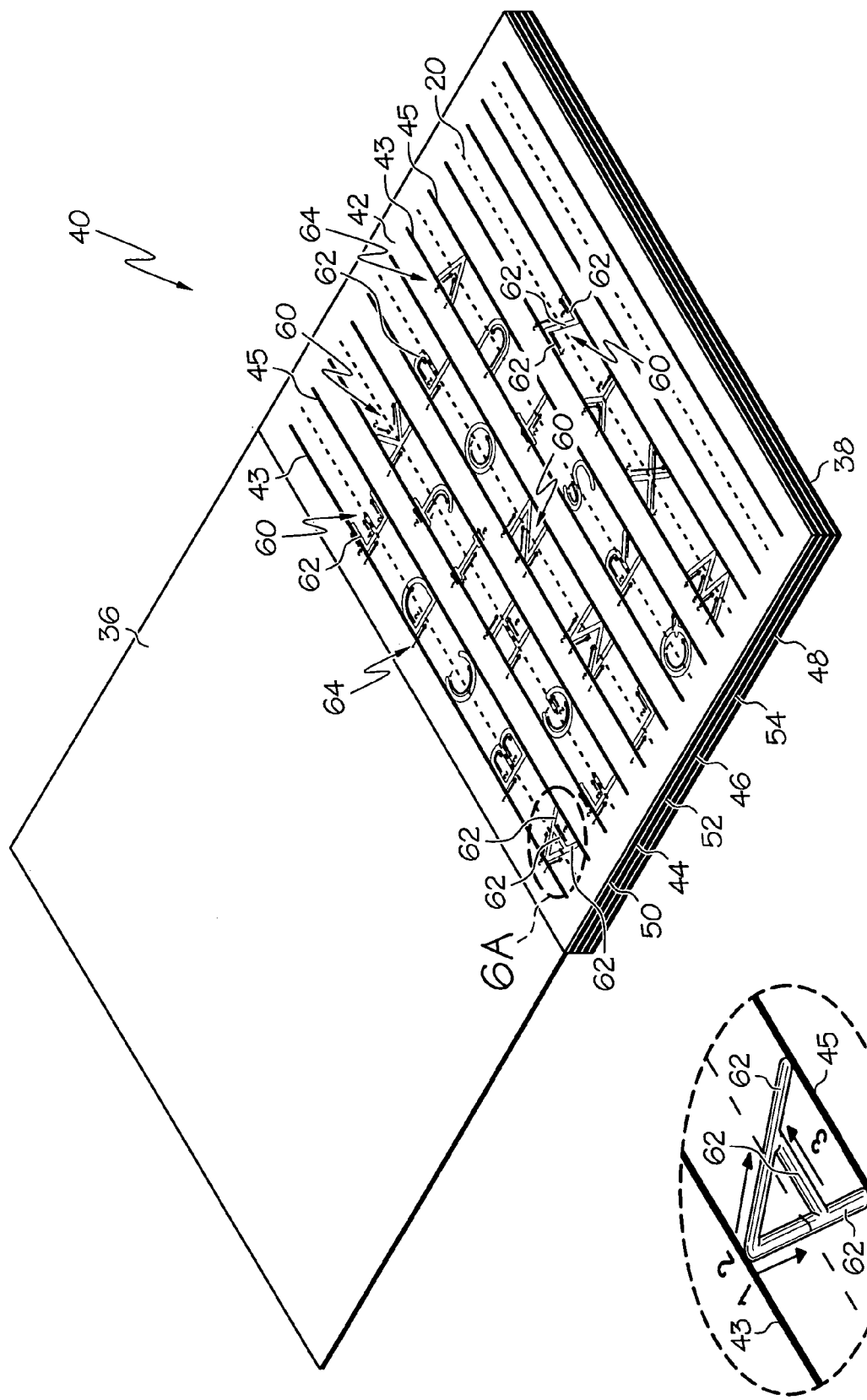
FIG. 6 is a front perspective view of the notebook of FIG. 5, showing the notebook opened to a first set of papers.
FIG. 6A is a detail view of the area 6A indicated in FIG. 6.

As shown in FIG. 6 the first set of sheets 42 may take the form of a plurality of pieces of sheet-like material. Each of the sheets of the first set of sheets 42, and indeed all of the sheets of the second 44, third 46 and fourth 48 sets of sheets, may be made of the same material and have the same properties as the sheets 10/body portion 12 described above. Each of the sheets in the first set of sheets 42 have a depressed area 60 in the shape of an alphanumeric character. For example, in illustrated embodiment, each sheet 42 includes depressed areas 60 in the form of the capital letters of the alphabet that are arranged in alphabetical order. However, the alphanumeric characters may also take the form of lower case letters, numbers and the likes, in a variety of formats, such as the printed, blocked, cursive, etc., and can be arranged in a variety of formats.

Each depressed area 60 forming an alphanumeric character may include one or a plurality of grooves 62 formed in the sheet 42. Each groove 62 may have a width (i.e., extending in a direction generally parallel to the surface of the sheet 42) of between about 2 mm and about 5 mm. Each groove 62 may have a depth (i.e., in a direction generally perpendicular to the sheet 42) of no more than about 0.5 mm. Each alphanumeric character may be made up of and include a plurality of grooves 62 (i.e., the illustrated embodiment the capital letter "A" includes three grooves 62) which intersect each other or are located immediately adjacent to each other.

The sheet 42 shown in FIG. 6 includes a plurality of alphabetic characters, each of which is distinct from and spaced apart from the other alphabetic characters. Each sheet 42 may include a plurality of first 43 and second 45 sets of generally flat printed parallel guidelines with the depressed areas 60 located therebetween. The guidelines 43, 45 may have a space therebetween of between about ¼" and about 2". If desired, the guidelines 43, 45 may be embossed or debossed.

The sheet 42 may further include writing guide indicia 64 associated with each depressed area 60/letter. The writing guide indicia 64 is printed on the sheet 42 to guide the writing of a user on or in the grooves 62. In particular, in the illustrated embodiment the guide indicia 64 includes printed numbers and/or printed arrows located adjacent to the letters. The printed numbers are chronologically arranged to provide an ordered set of guide steps to guide the writing of a user in the grooves 62. In addition, the printed arrows indicate stroke direction to guide the writing of a user.

For example, in the case of letter "A," a user is instructed to first place a writing instrument 69 at the top of the letter "A", and stroke down and to the left as indicated by the arrow number "1." The user will then again place the writing instrument 69 at the top of the letter and stroke the writing instrument 69 down and to the right as indicated by the arrow "2". Finally, the user will write in the cross-bar of the letter "A" as indicated by the arrow "3" (see FIG. 7).

In this manner, the guide indicia 64 provides very direct and specific instruments to guide a user who is learning to write. In addition, the grooves 62 help to ensure that the writer stays within the grooves 62 to obtain an effective result in the shape of a letter. The guide indicia 64 also helps to ensure a user learns the proper stroke methods when writing. In this manner, the combination of the grooves 62 and guide indicia 64 (forming a writing guide feature) provides a relative high level of guidance to the user and allows a user to develop motor skills and confidence.

Figure 8:
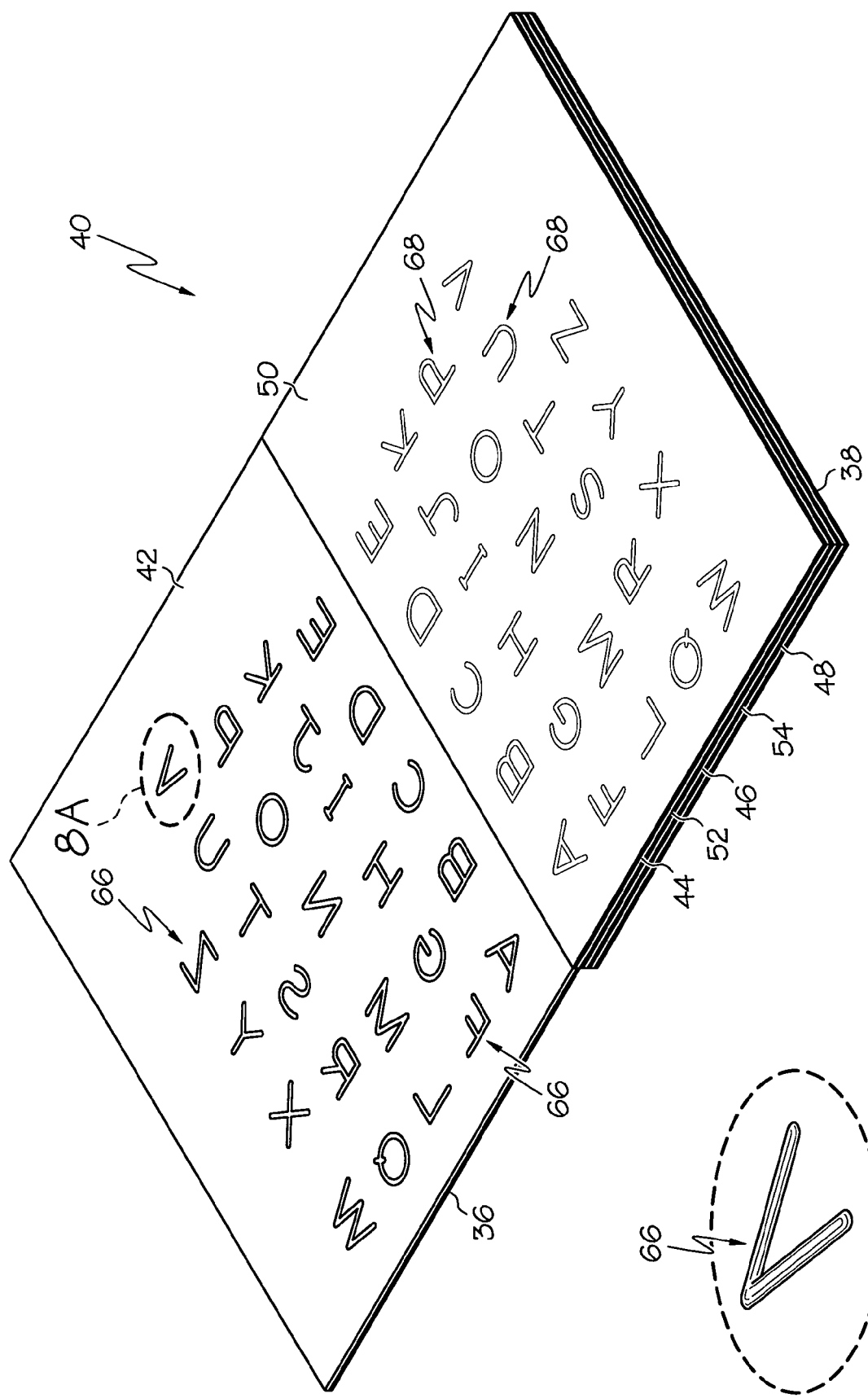
FIG. 8 is a front perspective view of the notebook of FIG. 5, showing the notebook opened to a first divider.

As shown in FIG. 8 the first divider 50 may be located below the first set of sheets 42. The depressed areas of the sheets 42 appear as raised letters 66 on the back side of the sheet 42 shown in FIG. 8. The divider 50 (and indeed each of the dividers 50, 52, 54) may have at least one of a stiffness or a thickness that is greater than each of the sheets 42, 44, 46, 48. For example, the dividers 50, 52, 54 may be made of cardboard, paperboard, plastic or the like. In the illustrated embodiment, the divider 50 has grooves 68 in the shape of letters that correspond in position and shape with the grooves 62 in the first set of sheets 42.

The grooves 68 in the divider 50 receive the grooves 62/depressed area 60 of the lower-most sheets 42 therein such that the grooves 62 in the sheet 42 and the grooves 68 in the divider 50 are nested. This arrangement ensures that the grooves 62 remain intact when the user utilizes the notebook 40. For example, if the divider 50 were to lack the grooves 68 and were instead generally flat and planar, the grooves 62/depressed area 60 in the sheets 42 would tend to flatten or disappear when a user was using the sheets 42, especially when only a few of the sheets 42 remain. If the grooves 62/depressed areas 60 in the sheets 42 were to be flattened out, this would, of course, reduce the functionality of the sheets 42. Thus, the divider 50 helps to support the grooves 62/depressed areas 60 of the sheets 42 and ensure all of the sheets 42 can function in the intended manner. In addition, the nested grooves 62/68 help to lock the sheets 42 in place and prevent inadvertent shifting of the sheets 42 during writing.

Figure 9:
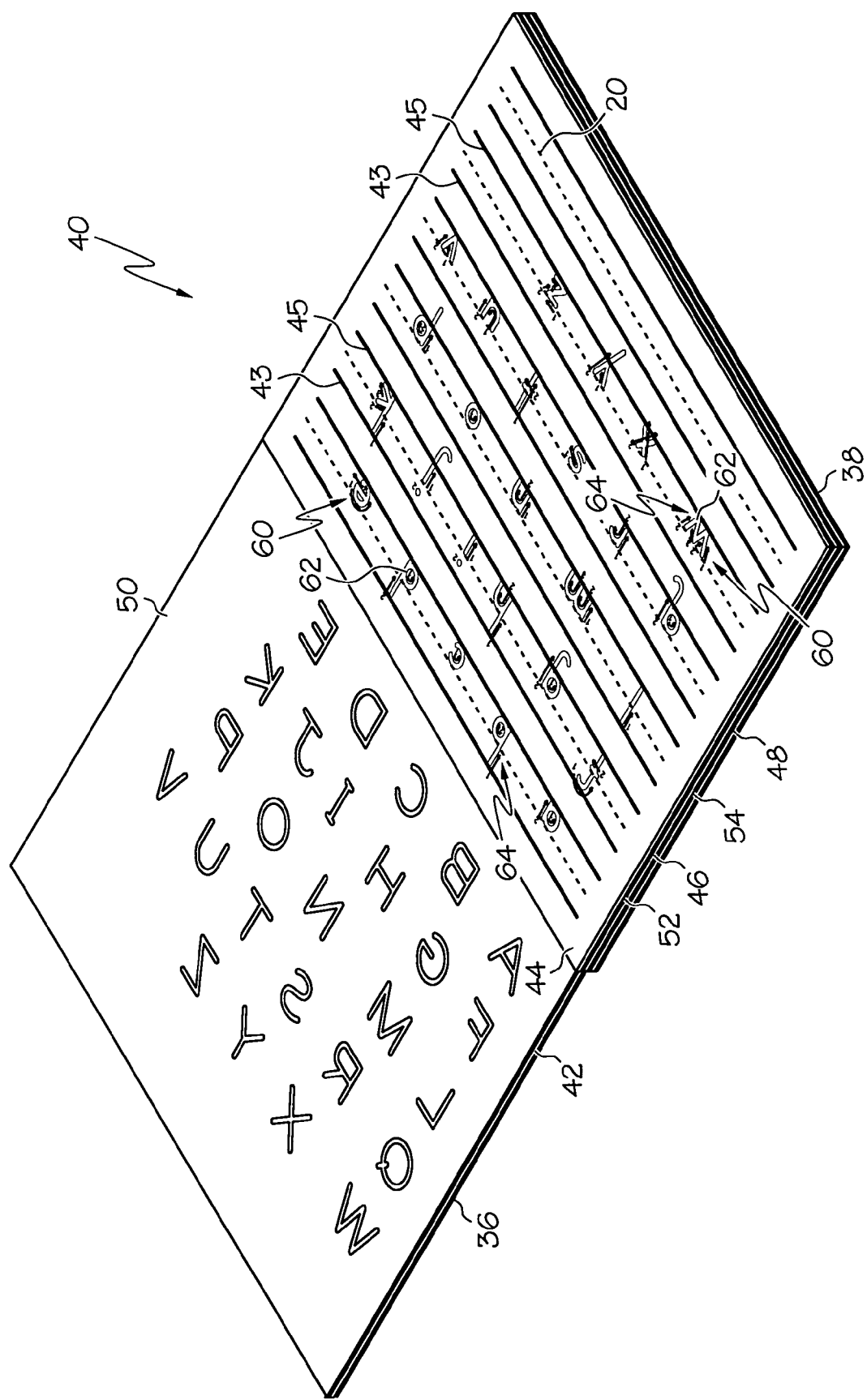
FIG. 9 is a front perspective view of the notebook of FIG. 5, showing the notebook opened to a second set of papers.

As shown in FIG. 9, the second set of sheets 44 may have depressed areas 60/grooves 62 in the form of lower case letters. The lower case letters are in the shape of depressed areas 60 or grooved lines 62 in a manner similar to the upper case letters of the first set of sheets 42. The second divider 52 has grooves corresponding to the lower case letters of the second set of sheets 44 and is located below the second set of sheets 44 in a manner similar to the first divider 50 described above.

Figure 10:
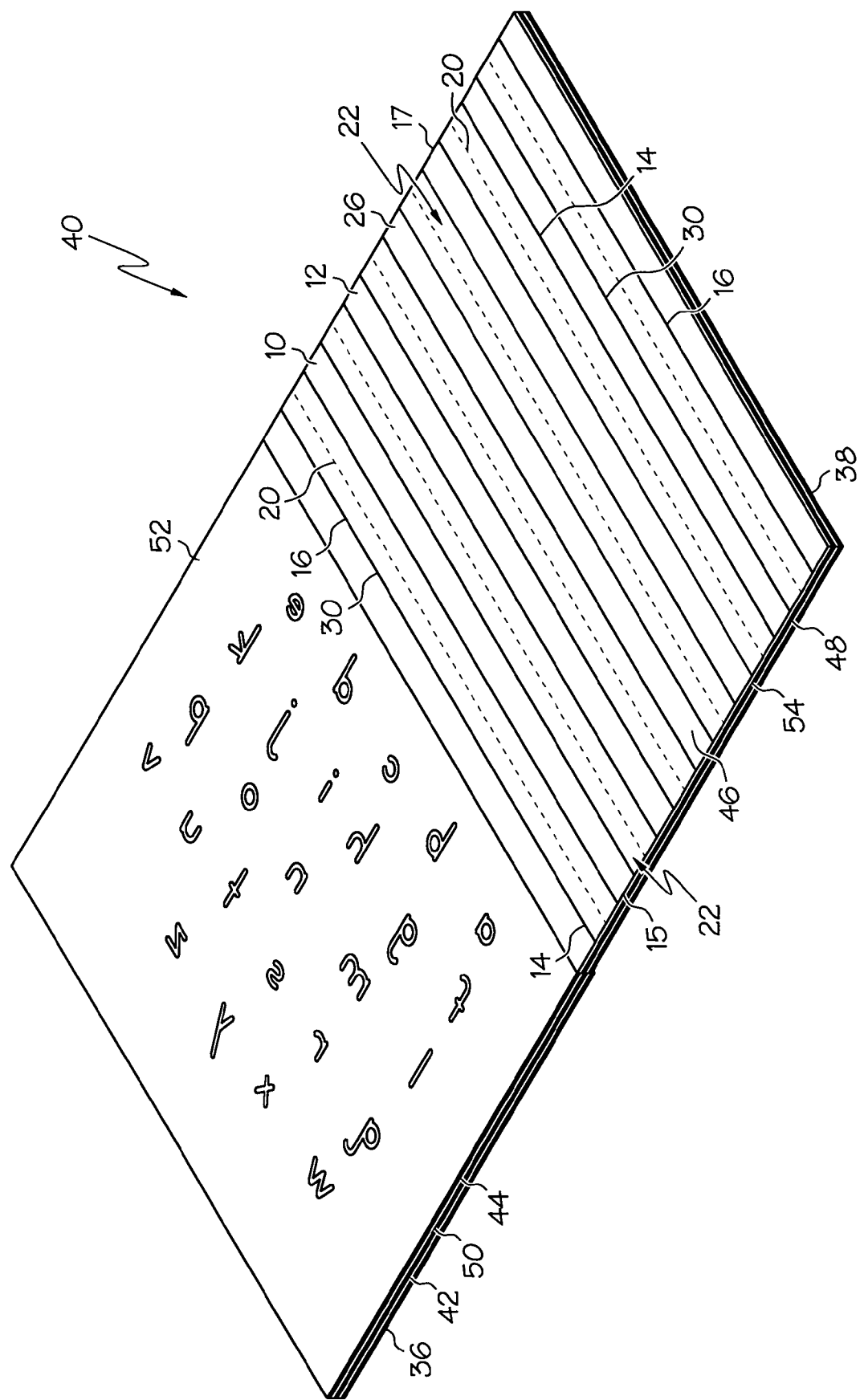
FIG. 10 is a front perspective view of the notebook of FIG. 5, showing the notebook opened to a third set of papers.
Figure 11:
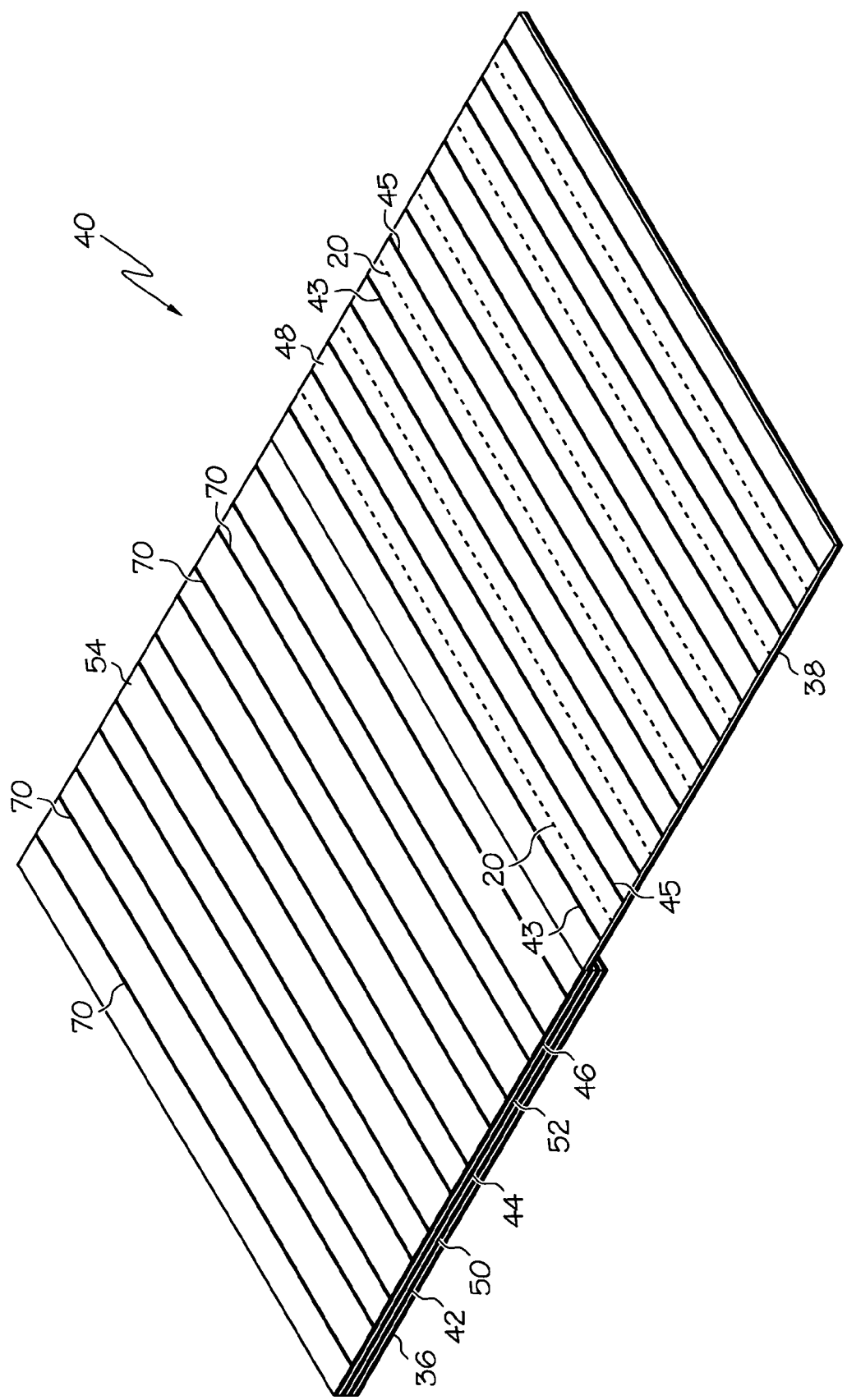
FIG. 11 is a front perspective view of the notebook of FIG. 5, showing the notebook opened to a fourth set of papers.

As shown in FIG. 10, the third set of sheets 46 may be in the form of the sheets 10/body portion 12 described above and shown in FIG. 1-3. The rear side 26 of the sheets 10 (with reference to FIGS. 1-3) is facing upwardly in FIG. 10. Thus the lines 16 are debossed in the embodiment illustrated in FIG. 10. The guidelines 14 provide a writing guide feature in or on the third set of sheets 46. The third divider 54 may includes grooves 70 formed therein that correspond to the guidelines 14 and nest/support the guidelines 14. FIG. 11 illustrates the backside of the third divider 54, wherein the grooves 70 take a form of raised "beads" or protrusions which correspond in shape and position to the grooves 54/raised guidelines 14 of the sheets 10. In this manner, the third divider 54 supports the grooves in the sheets 10 to ensure the embossed lines 16 remain debossed and resist flattening.

As shown in FIG. 11, the notebook 40 may include the fourth set of sheets 48. In the illustrated embodiment the fourth set of sheets 48 take the form of generally flat papers 48 which lack any embossed/debossed areas. A plurality of flat guidelines in the form of solid 43, 45 and dotted 20 lines are printed thereon. The printed lines 43, 45, 20 thus provide a writing guide feature in or on the fourth set of sheets 48. The rear cover 38 may be located below the fourth set of sheets and the front cover may 36 cover the first set of sheets 42. The front 36 and rear 38 covers help to protect the notebook 40 when the notebook 40 is in its closed position.

The spacing between the guidelines 43, 45 of the first 42 and second 44 and third 48 sets of sheets may correspond to the spacing between the guidelines 14 of the third set of sheets 46. This consistency of spacing allows a user to utilize the first 42, second 44, third 46 or fourth 48 sets of sheets without having to adjust to differing spacing.

The notebook 40 of FIGS. 5-11 provides a progressive writing guide. In particular, the first 42 and second 44 set of sheets provide a relatively high level of writing guide features to a user in the form of grooves and guide indicia. In this manner, the user can utilize the first 42 and second 44 sets of sheets to develop writing skills and confidence.

Once the writer becomes comfortable using the first 42 and second 44 sets of sheets, the user can progress to the third 46 set of sheets, which includes only the embossed/debossed lines and printed guidelines 16 as the writing guide feature. When utilizing the third set of sheets 46 the user must learn to form the character by himself or herself, but the embossed/debossed lines 16 help to ensure the user remains within the lines during writing. Finally, once the users' writing skills have sufficiently progressed, the user can utilize the fourth set of sheets 48 which includes only printed guidelines thereon as the writing guide feature. Thus, the notebook 40 of FIGS. 5-11 provides a variety of writing guidance features, but also allows a user to advance through the notebook as his or her skills are developed. In addition, as a user progresses into the various new sets of sheets, the user may feel a sense of accomplishment.

Having described the invention in detail and by reference to the preferred embodiments, it will be apparent that modifications and variations thereof are possible without departing from the scope of the invention.

What is claimed is:

1. A progressive writing guide system comprising:
    a first set of papers including a writing guide feature, said first set of papers being comprised of a plurality of first papers; and
    a second set of papers including a writing guide feature, said second set of papers being comprised of a plurality of second papers, said writing guide feature of said second set of papers including a generally straight debossed or embossed guideline formed thereon, said second set of papers being coupled to said first set of papers;
    wherein said writing guide feature of said first set of papers is configured for providing more guidance to a user than said writing guide feature of said second set of papers, and wherein the first set of papers is grouped separate from the second set of papers; and
    wherein said writing guide feature of said first set of papers includes grooves and writing indicia, and said writing guide of said second set of papers only includes at least one said debossed or embossed line and at least one printed guideline on each given said second paper.

2. The writing guide of claim 1 wherein said piece of sheet-like material is made from a generally water absorbent material, a pulp-based paper, or a cellulose-based paper.

3. The writing guide of claim 1 wherein said piece of sheet-like material has a thickness of less than about 0.5 mm.

4. The system of claim 1 wherein said guideline extends along at least 50% of a length or width of said supplemental piece of sheet-like material.

5. The system of claim 1 wherein said writing guide feature of said first set of papers includes a plurality of depressed areas in the shape of an alphanumeric character.

6. The system of claim 1 wherein said writing guide feature of said second set of papers includes at least one printed line located on and extending at least partially along said embossed or depressed guideline.

7. The system of claim 1 further comprising a third set of papers including a writing guide feature, said third set of papers being comprised of a plurality of third papers, said third set of papers being coupled to said first and second sets of papers, wherein said writing guide feature of said second set of papers is configured for providing more guidance than said writing guide feature of said third set of papers.

8. The system of claim 1 wherein said first and second sets of papers are bound together.

9. The system of claim 1 wherein said first and second sets of papers are generally aligned.

10. The system of claim 1 wherein said first set of papers includes first and second subsets of papers, said first subset of papers presenting capital letters, said second subset of papers presenting lowercase letters.

11. The system of claim 1 wherein said first set of papers is separated from said second set of papers by a divider.

12. The system of claim 5 wherein each depressed area is distinct from and spaced apart from any other depressed area.

13. The system of claim 5 wherein each depressed area includes at least one groove.

14. The system of claim 13 wherein said groove has a width of between 2 mm and 5 mm.

15. The system of claim 13 wherein said groove has a depth of no more than 0.5 mm.

16. The system of claim 5 wherein each depressed area includes a plurality of grooves that intersect each other or are located immediately adjacent to each other.

17. The system of claim 5 wherein said writing guide feature of said first set of papers comprises guide indicia printed on a given said first sheet to guide the writing of a user writing on a given said depressed area.

18. The system of claim 6 wherein at least one said printed line and said guideline are spaced apart by a distance of between ¼" and 2" to provide a writing space therebetween.

19. The system of claim 6 wherein said writing guide feature of said first set of papers includes printed numbers and printed arrows located adjacent to each depressed area.

20. The system of claim 19 wherein said numbers are chronologically arranged to provide an ordered set of guide steps to guide the writing of a user, and wherein said printed arrows indicate the stroke direction to guide the writing of a user on said depressed area.

21. The system of claim 7 wherein said writing guide feature of said third set of papers includes a set of printed parallel spaced-apart lines.

22. The system of claim 7 further including a plurality of dividers, wherein a first divider is used to separate said first set of papers from said second set of papers and a second divider is used to separate said second set of papers from said third set of papers.

23. The system of claim 17 wherein said writing guide feature of said first set of papers includes at least one of printed numbers or printed arrows located adjacent to each depressed area.

24. The system of claim 5 further comprising a first piece of backing material located below the first set of papers, said first piece of backing material having at least one of a stiffness or thickness that is greater than each of the papers in said first set of papers, said first piece of backing material having a depressed area in the shape of an alphanumeric character that is generally aligned with and nested with said alphanumeric character of each of the papers in the first set of papers.

25. The system of claim 5 further comprising a second piece of backing material located below the second set of papers, said second piece of backing material having at least one of a stiffness or thickness that is greater than each of the papers in said second set of papers, said second piece of backing material having a groove formed therein that is nested with said debossed or embossed line in each of the papers in the second set of papers.

* * * * *